(12) United States Patent
Prakash et al.

(10) Patent No.: US 12,465,065 B2
(45) Date of Patent: Nov. 11, 2025

(54) METHOD OF PREPARING BEVERAGES WITH ENHANCED SWEETNESS WITH CYCLAMATE

(71) Applicant: The Coca-Cola Company, Atlanta, GA (US)

(72) Inventors: Indra Prakash, Alpharetta, GA (US); Gil Ma, Atlanta, GA (US); Juvenal Higiro, Atlanta, GA (US); Xiaoliang Tan, Marietta, GA (US)

(73) Assignee: The Coca-Cola Company, Atlanta, GA (US)

( * ) Notice: Subject to any disclaimer, the term of this patent is extended or adjusted under 35 U.S.C. 154(b) by 122 days.

(21) Appl. No.: 18/170,346

(22) Filed: Feb. 16, 2023

(65) Prior Publication Data

US 2023/0232866 A1 Jul. 27, 2023

Related U.S. Application Data

(62) Division of application No. 16/617,658, filed as application No. PCT/US2018/035310 on May 31, 2018, now Pat. No. 11,612,175.

(60) Provisional application No. 62/512,826, filed on May 31, 2017.

(51) Int. Cl.
| | | |
|---|---|---|
| *A23L 2/60* | (2006.01) | |
| *A23L 2/68* | (2006.01) | |
| *A23L 27/12* | (2016.01) | |
| *A23L 27/30* | (2016.01) | |

(52) U.S. Cl.
CPC ................. *A23L 2/60* (2013.01); *A23L 2/68* (2013.01); *A23L 27/13* (2016.08); *A23L 27/36* (2016.08); *A23V 2002/00* (2013.01)

(58) Field of Classification Search
CPC . A23L 2/60; A23L 27/13; A23L 27/36; A23L 2/68; A23V 2002/00

USPC ........................................................ 426/548
See application file for complete search history.

(56) References Cited

U.S. PATENT DOCUMENTS

| | | | |
|---|---|---|---|
| 2008/0292765 A1* | 11/2008 | Prakash | .................. A23L 27/88 426/548 |
| 2014/0271996 A1* | 9/2014 | Prakash | ..................... A23L 2/60 426/66 |
| 2015/0018432 A1 | 1/2015 | Prakash et al. | |
| 2015/0359251 A1 | 12/2015 | Jackson et al. | |
| 2018/0292765 A1 | 10/2018 | Prakash et al. | |

OTHER PUBLICATIONS

Supplementary European Search Report from European Patent Application No. 18809467.6, issued Mar. 29, 2021.
International Search Report from PCT Patent Application No. PCT/US2018/035310, issued Aug. 24, 2018.
Schiffman et al: "Investigation of synergism in binary mixtures of sweeteners", Brain Research Bulletin, Elsevier Science Ltd, Oxford, GB, vol. 38, No. 2, Jan. 1, 1995, pp. 105-120.
Dubois Ge et al: "Non-caloric sweeteners, sweetness modulators, and sweetener enhancers", Annual Review of Food Science and Technology, Annual Reviews, US, vol. 3, Jan. 1, 2012, pp. 353-380.

* cited by examiner

*Primary Examiner* — Brent T O'Hern
(74) *Attorney, Agent, or Firm* — King & Spalding

(57) ABSTRACT

Consumables comprising cyclamate and a steviol glycoside sweetener or mogroside sweetener are provided herein, wherein cyclamate, when present in an amount at or below its sweetness recognition threshold concentration, enhances the sweetness of and, optionally, improves the sweetness profile the sweetener, thereby providing a consumable that tastes more like a sucrose-sweetened consumable. Methods of enhancing the sweetness of a consumable, methods of making a consumable taste more like a sucrose-sweetened consumable and methods of preparing consumables are also detailed herein.

6 Claims, No Drawings

METHOD OF PREPARING BEVERAGES WITH ENHANCED SWEETNESS WITH CYCLAMATE

CROSS-REFERENCE TO RELATED APPLICATIONS

This application is divisional of U.S. patent application Ser. No. 16/617,658, filed Nov. 27, 2019, which is a national phase application under 35 U.S.C. § 371 of International Application No. PCT/US2018/035310, filed on May 31, 2018, which claims priority to U.S. Provisional Patent Application No. 62/512,826 filed May 31, 2017. The contents of each of the above-identified applications is hereby fully incorporated herein by reference.

FIELD OF THE INVENTION

The present invention relates generally to consumables containing certain steviol glycoside and/or mogroside sweeteners and cyclamate. The present invention further extends to methods of enhancing the sweetness of a consumable, methods of making a consumable taste more like a sucrose-sweetened consumable and methods of preparing consumables.

BACKGROUND OF THE INVENTION

Natural caloric sugars, such as sucrose, fructose and glucose, are utilized to provide a pleasant taste to beverages, foods, pharmaceuticals, oral hygienic and cosmetic products. Sucrose, in particular, imparts a taste preferred by consumers. Although sucrose provides superior sweetness characteristics, it is caloric. Non-caloric or low caloric sweeteners have been introduced to satisfy consumer demand.

*Stevia rebaudiana* Bertoni is a perennial shrub of the Asteraceae (Compositae) family native to certain regions of South America. Its leaves have been traditionally used for hundreds of years in Paraguay and Brazil to sweeten local teas and medicines. The plant is commercially cultivated in Japan, Singapore, Taiwan, Malaysia, South Korea, China, Israel, India, Brazil, Australia and Paraguay. The leaves of the plant contain diterpene glycosides in an amount ranging from about 10 to 20% of the total dry weight. These diterpene glycosides are about 150 to 450 times sweeter than sugar. Structurally, the diterpene glycosides are characterized by a single base, steviol, and differ with respect to the presence of carbohydrate residues at positions C13 and C19. Typically, on a dry weight basis, the four major steviol glycosides are dulcoside A (0.3%), rebaudioside C (0.6-1.0%), rebaudioside A (3.8%) and stevioside (9.1%). Other steviol glycosides identified in *Stevia* extract include rebaudioside B, D, E, and F, steviolbioside and rubusoside. Among these, stevioside and rebaudioside A are available on a commercial scale, and are increasingly being used as part of sweetener systems in various food and beverage products. Rebaudioside A has improved properties over stevioside, but still suffers from an aftertaste (i.e. sweetness linger, latent sweetness sensation) that is unacceptable at concentrations typical of beverage formulations—even longer than that found for aspartame. Moreover, rebaudioside A does not achieve a maximal sucrose equivalence greater than 10%. As such, beverages with greater than 10% sucrose equivalence (which is typical of commercial beverage formulations) cannot be prepared with rebaudioside A alone. Additional sweeteners (e.g. erythritol, sucrose, etc.) are typically added to rebaudioside A to increase the maximal sucrose equivalence.

More recently, rebaudioside M (also called rebaudioside X), (13-[(2-O-β-D-glucopyranosyl-3-O-β-D-glucopyranosyl-β-D-glucopyranosyl)oxy]ent kaur-16-en-19-oic acid-[(2-O-β-D-glucopyranosyl-3-O-β-D-glucopyranosyl-(3-D-glucopyranosyl) ester], was isolated from *Stevia rebaudiana* and characterized. It has an improved taste profile over rebaudioside A, as detailed in U.S. Pat. No. 9,169,285, (incorporated by referenced herein) and has a maximal sucrose equivalence greater than 10%, such that rebaudioside M can be used as a single sweetener in beverage formulations. Despite this, the taste profile of rebaudioside M-sweetened beverages still differ from sucrose-sweetened beverages, as rebaudioside M elicits some undesirable taste properties comparatively, e.g. bitter after taste, poor mouthfeel, slow sweetness onset, sweetness linger, astringency, bitterness and licorice taste.

As such, there remains a need to address the undesirable taste properties of rebaudioside M, and other steviol glycoside and mogroside sweeteners, in order to provide sweetened beverages that taste more like sucrose-sweetened beverages.

SUMMARY OF THE INVENTION

The present invention provides consumables comprising (i) a steviol glycoside sweetener comprising at least one steviol glycoside in a sweetening amount (referred to herein as a "steviol glycoside sweetener") or a mogroside sweetener comprising at least one mogroside in a sweetening amount (referred to herein as a "mogroside sweetener") and (ii) cyclamate, wherein cyclamate is present in a concentration at or below its sweetness recognition threshold.

Exemplary consumables include, but are not limited to, pharmaceutical compositions, edible gels and mixes, dental compositions, confections, condiments, chewing gum, cereal compositions, baked goods, dairy products, tabletop sweeteners, beverages and beverage products.

In particular embodiments, the consumable is a beverage or beverage product. In embodiments where the consumable is a beverage, the beverage can be a full-calorie, mid-calorie, low-calorie or zero-calorie beverage.

In one embodiment, cyclamate is present in the consumable in a concentration below its sweetness recognition threshold concentration. In another embodiment, cyclamate is present in the consumable in a concentration from about 1 ppm to about 200 ppm, more preferably from about 1 ppm to about 100 ppm.

In exemplary embodiments, cyclamate is present in the consumable in an amount effective to enhance the sucrose equivalence of the consumable by at least about 1.2-fold (times) compared to the sucrose equivalence of the consumable in the absence of cyclamate.

Cyclamate optionally also serves as a taste modulator, positively impacting the taste profile of the steviol glycoside sweetener or mogroside sweetener in a consumable in such a way that the consumable tastes more like a sucrose-sweetened consumable. Exemplary taste attributes that can be improved by cyclamate include bitterness, bitter linger, sourness, astringency, saltiness, metallic notes, mouthfeel, sweetness linger and sweetness onset. In certain embodiments, multiple taste attributes are positively modulated simultaneously.

In exemplary embodiments, the steviol glycoside sweetener is a steviol glycoside blend or *Stevia* extract. The at least one steviol glycoside present in a sweetening amount has a purity of at least about 5%, preferably at least about 50%.

In exemplary embodiments, the mogroside sweetener is a mogroside blend or Luo Han Guo extract. The at least one mogroside present in a sweetening amount has a purity of at least about 5%, preferably at least about 50%.

In exemplary embodiments, the steviol glycoside sweetener comprises rebaudioside M in a sweetening amount. Rebaudioside M is preferably at least about 50% pure. In a particular embodiment, rebaudioside M is at least about 50% pure in a *Stevia* extract or steviol glycoside blend.

The concentration of the steviol glycoside sweetener in a consumable can vary, and is typically from about 50 ppm to about 600 ppm, more preferably from about 100 ppm to about 400 ppm.

In some embodiments, the at least one steviol glycoside or at least one mogroside described herein is the only compound present in the consumable in a sweetening amount. In other embodiments, a consumable already has as sweetener on-board (e.g. juice) and the steviol glycoside sweetener or mogroside sweetener is the only sweetener added to the consumable.

The steviol glycoside sweetener or mogroside sweetener contributes to a consumable's sweetener component, which further comprises at least one additional sweetener. In one embodiment, a consumable comprises a sweetener component comprising both a steviol glycoside sweetener or mogroside sweetener and at least one additional sweetener, wherein both are added to the consumable. The sweeteners can be added together or sequentially. In another embodiment, a consumable comprises a sweetener component comprising added steviol glycoside sweetener or mogroside sweetener and on-board additional sweeteners (e.g. juices).

The present invention also provides compositions comprising (i) a steviol glycoside sweetener or a mogroside sweetener and (ii) cyclamate, wherein the steviol glycoside sweetener or mogroside sweetener is present in the composition in an amount such that, when the composition is added to a consumable, the steviol glycoside sweetener or mogroside sweetener is present in the consumable in a sweetening amount, and wherein cyclamate is present in the composition in an amount such that, when the composition is added to a consumable, cyclamate is present in a concentration at or below its sweetness recognition threshold.

The present invention also provides a method of enhancing the sweetness of a consumable comprising (i) providing a consumable comprising a steviol glycoside sweetener or a mogroside sweetener and (ii) adding cyclamate to the consumable in an amount effective to provide a consumable with enhanced sweetness, wherein cyclamate is added in an amount at or below its sweetness recognition threshold concentration. In exemplary embodiments, the sucrose equivalence of the consumable is enhanced by at least about 1.2-fold compared to the sucrose equivalence of the consumable in the absence of cyclamate. In a particular embodiment, the consumable is a beverage.

The present invention also provides a method of preparing a consumable comprising (i) providing a consumable comprising a steviol glycoside sweetener or a mogroside sweetener and (ii) adding cyclamate to the consumable, wherein cyclamate is present in the consumable in a concentration at or below its sweetness recognition threshold.

DETAILED DESCRIPTION OF THE INVENTION

The present invention provides consumables comprising cyclamate and a steviol glycoside sweetener or mogroside sweetener. For example, it has been found that cyclamate, when present in concentrations below its sweetness recognition threshold concentration, enhances the sweetness of rebaudioside M and improves the sweetness profile of rebaudioside M.

Accordingly, a consumable of the present invention has increased sweetness and a more sucrose-like taste profile compared to a corresponding consumable without cyclamate.

I. Definitions

"Consumables," as used herein, mean substances which are contacted with the mouth of man or animal, including substances which are taken into and subsequently ejected from the mouth and substances which are drunk, eaten, swallowed or otherwise ingested, and are safe for human or animal consumption when used in a generally acceptable range.

"Sweetener", as used herein, refers to a substance that provide detectable sweetness when present in a consumable.

"Sweetening amount", as used herein, refers to an amount of a substance that provides detectable sweetness when present in a consumable.

"Sweetener component", as used herein, refers to all of the compounds in a consumable that contribute to the consumable's sweetness, i.e. all the substances that are detectably sweet. These substances can either be added to the consumable or already on-board/inherent to the consumable (e.g. juice).

"Sweetness enhancer", as used herein, refers to a compound that enhances, amplifies or potentiates the perception of sweetness of a consumable (e.g. a beverage) when said compound is present in the consumable in a concentration at or below the compound's sweetener recognition threshold, i.e. a concentration at which the compound does not contribute any noticeable sweet taste in the absence of additional sweetener(s). The term "sweetness recognition threshold concentration," as generally used herein, is the lowest known concentration of a compound that is perceivable by the human sense of taste as sweet (ca. 1.5% sucrose equivalence). The sweetness recognition threshold concentration is specific for a particular compound, and can vary based on temperature, matrix, ingredients and/or flavor system.

The term "sweetness enhancer" is synonymous with the terms "sweet taste potentiator," "sweetness potentiator," "sweetness amplifier," and "sweetness intensifier."

"Taste modulator", as used herein, refers to a compound that positively impacts the perception of a non-sucrose sweetener in a consumable (e.g. a beverage) in such a way that the consumable tastes more like a sucrose-sweetened beverage. For example, certain negative taste properties of non-sucrose sweeteners can be masked with taste modulators, e.g. bitterness, sourness, astringency, saltiness, licorice and metallic notes. In another example, mouthfeel can be improved. In still other examples, sweetness linger and bitterness linger can be decreased. In yet another example, sweetness onset can be increased. In a further example, sweetness onset can be improved. In a still further example, the bitterness linger can be improved.

II. Steviol Glycosides

A steviol glycoside sweetener comprises at least one steviol glycoside in a sweetening amount. The steviol glycoside sweetener can comprise steviol glycosides that are natural, synthetic or a combination of natural and synthetic.

Exemplary steviol glycosides include, but are not limited to, rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside J, rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides and combinations thereof.

In one embodiment, the steviol glycoside sweetener is a steviol glycoside provided in pure form. In another embodiment, the steviol glycoside sweetener is at least one steviol glycoside provided in the form of a mixture, e.g. a steviol glycoside blend or *Stevia* extract.

In a particular embodiment, the steviol glycoside sweetener comprises rebaudioside M. In a more particular embodiment, the steviol glycoside sweetener comprises rebaudioside M in a sweetening amount.

The at least one steviol glycoside can be obtained from any source. In exemplary embodiments, the at least one steviol glycoside is extracted from *Stevia* plant. In other exemplary embodiments, the at least one steviol glycoside is synthetically prepared. In still other exemplary embodiments, the at least one steviol glycoside is produced by fermentation or biosynthesis.

Methods of purifying steviol glycosides are known to those of skill in the art. In certain embodiments, a sweetener, extract, or steviol glycoside blend is enriched in the at least one steviol glycoside present in a sweetening amount. Steviol glycoside content can be increased according to methods known to those of skill in the art, e.g. recrystallization and/or chromatographic methods, particularly HPLC.

In one embodiment, the purity of a steviol glycoside is at least about 5% (i.e. 5% by weight on a dry basis in a mixture, e.g. sweetener, steviol glycoside blend, or extract), such as, for example, at least about 10%, at least about 20%, at least about 30%, at least about 40%, at least about 50%, at least about 60%, at least about 70%, at least about 80%, at least about 90%, at least about 95% or at least about 97%.

In exemplary embodiments, the purity of a steviol glycoside is at least about 50%, such as, for example, from about 50% to about 90%, from about 50% to about 80%, from about 50% to about 70%, from about 50% to about 60%, from about 60% to about 90%, from about 60% to about 80%, from about 60% to about 70%, from about 70% to about 90%, from about 70% to about 80% and from about 80% to about 90%.

In embodiments where a steviol glycoside blend comprises rebaudioside M, the steviol glycoside blend preferably has a total steviol glycoside content of about 95% by weight or greater on a dry basis. "Total steviol glycoside content", as used herein, refers to the sum of the relative weight contributions of each steviol glycoside in a sample. The remaining 5% comprises other non-steviol glycoside compounds, e.g. by-products from extraction or purification processes. In some embodiments, the steviol glycoside blend sweetener has a total steviol glycoside content of about 96% or greater, about 97% or greater, about 98% or greater or about 99% or greater.

III. Mogrosides

A mogroside sweetener comprises at least one mogroside in a sweetening amount. The at least one mogroside can be natural, synthetic or a combination of natural and synthetic.

Exemplary mogrosides include, but are not limited to, any of grosmogroside I, mogroside IA, mogroside IE, 11-oxomogroside IA, mogroside II, mogroside II A, mogroside II B, mogroside II E, 7-oxomogroside II E, mogroside III, Mogroside Me, 11-deoxymogroside III, mogroside IV, 11-oxomogroside IV, 11-oxomogroside IV A, mogroside V, isomogroside V, 11-deoxymogroside V, 7-oxomogroside V, 11-oxomogroside V, isomogroside V, mogroside VI, mogrol, 11-oxomogrol, siamenoside I, mogro-3-O-[β-D-glucopyranoside]-24-O-{[β-D-glucopyranosyl-(1→2)]-[α-D-glucopyranosyl-(1→6)]-β-D-glucopyranoside} and combinations thereof.

In a particular embodiment, the mogroside sweetener comprises siamenoside I in a sweetening amount.

In one embodiment, the mogroside sweetener is a mogroside provided in pure form. In another embodiment, the mogroside sweetener is at least one mogroside provided in the form of a mixture, e.g. a mogroside blend or Luo Han Guo extract.

The at least one mogroside can be obtained from any source. In exemplary embodiments, the at least one mogroside is extracted from Luo Han Guo. In other exemplary embodiments, the at least one mogroside is synthetically prepared. In still other exemplary embodiments, the at least one mogroside is produced by fermentation or biosynthesis.

Methods of purifying mogrosides are known to those of skill in the art. In certain embodiments, a sweetener, extract, or mogroside blend is enriched in the at least one mogroside present in a sweetening amount. Mogroside content can be increased according to methods known to those of skill in the art, e.g. recrystallization and/or chromatographic methods, particularly HPLC.

In one embodiment, the purity of a mogroside is at least about 5% (i.e. 5% by weight on a dry basis in a mixture, e.g. sweetener, mogroside blend, or extract), such as, for example, at least about 10%, at least about 20%, at least about 30%, at least about 40%, at least about 50%, at least about 60%, at least about 70%, at least about 80%, at least about 90%, at least about 95% or at least about 97%.

In exemplary embodiments, the purity of a mogroside is at least about 50%, such as, for example, from about 50% to about 90%, from about 50% to about 80%, from about 50% to about 70%, from about 50% to about 60%, from about 60% to about 90%, from about 60% to about 80%, from about 60% to about 70%, from about 70% to about 90%, from about 70% to about 80%, and from about 80% to about 90%.

In exemplary embodiments, a mogroside blend preferably has a total mogroside content of about 95% by weight or greater on a dry basis. "Total mogroside content", as used herein, refers to the sum of the relative weight contributions of each mogroside in a sample. The remaining 5% comprises other non-mogroside compounds, e.g. by-products from extraction or purification processes. In some embodiments, the mogroside blend sweetener has a total mogroside content of about 96% or greater, about 97% or greater, about 98% or greater or about 99% or greater.

IV. Cyclamate

"Cyclamate", as used herein, refers to sodium cyclamate having the following structure:

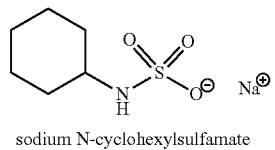 [SMILES: O=S(=O)([O-])NC1CCCCC1 ; [Na+]]

sodium N-cyclohexylsulfamate

Cyclamate is an artificial sweetener that is 30-50 times sweeter than sucrose. The sweetness recognition threshold concentration of cyclamate is from 120 to about 200 ppm.

In one embodiment, cyclamate is provided in purified form. In another embodiment, cyclamate is provided in the form of a mixture.

For example, cyclamate may comprise at least about 50% by weight of a mixture, such as, for example, at least about 60%, at least about 70%, at least about 80%, at least about 90% or at least about 95%. In a more particular embodiment, cyclamate comprises at least about 96%, at least about 97%, at least about 98% or at least about 99% by weight of a mixture.

V. Sweetener Component

The steviol glycoside sweetener or mogroside sweetener contribute to a consumable's sweetener component, which further comprises at least one additional sweetener. In one embodiment, the steviol glycoside sweetener or mogroside sweetener and at least one additional sweetener are added to the consumable. In another embodiment, the at least one additional sweetener is already on-board on the consumable (i.e. juice), and the steviol glycoside sweetener or mogroside sweetener is added to the consumable.

In exemplary embodiments, the steviol glycoside sweetener or mogroside sweetener comprises at least about 50% by weight of the sweetener component, such as for example, at least about 60%, at least about 70%, at least about 80%, at least about 90% or at least about 95%. In a particular embodiment, the at least one steviol glycoside or at least one mogroside comprises at least about 96%, at least about 97%, at least about 98% or at least about 99% of the sweetener component.

The additional sweetener used in the sweetener component can be any known sweetener, e.g. a natural sweetener, a natural high potency sweetener, a synthetic sweetener.

As used herein, the phrase "natural high potency sweetener" refers to any sweetener found naturally in nature and characteristically has a sweetness potency greater than sucrose, fructose, or glucose, yet has less calories. The natural high potency sweetener can be provided as a pure compound or, alternatively, as part of an extract. As used herein, the phrase "synthetic sweetener" refers to any composition which is not found naturally in nature and characteristically has a sweetness potency greater than sucrose, fructose, or glucose, yet has less calories.

In one embodiment, the additional sweetener is a carbohydrate sweetener. Non-limiting examples of suitable carbohydrate sweeteners include sucrose, fructose, glucose, erythritol, maltitol, lactitol, sorbitol, mannitol, xylitol, tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof. D- or L-configurations can be used when applicable. In other embodiments, the additional sweetener is a carbohydrate sweetener selected from the group consisting of glucose, fructose, sucrose and combinations thereof. In another embodiment, the additional sweetener is a carbohydrate sweetener selected from D-allose, D-psicose, L-ribose, D-tagatose, L-glucose, L-fucose, L-Arbinose, Turanose and combinations thereof.

Carbohydrates are present in the sweetener component in an amount effective to provide a concentration from about 100 ppm to about 140,000 ppm when present in a consumable, such as, for example, a beverage.

In another embodiment, the sweetener component does not comprise a carbohydrate sweetener.

In one embodiment, the additional sweetener is not directly derived from a natural extraction. Such a sweetener characteristically has a sweetness potency greater than sucrose, fructose, or glucose, yet has less calories. Non-limiting examples of such sweeteners include, but are not limited to, sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof. The synthetic sweetener is present in the sweetener component in an amount effective to provide a concentration from about 0.3 ppm to about 3,500 ppm when present in a consumable, such as, for example, a beverage.

In one embodiment, the additional sweetener is a natural high potency sweetener. Suitable natural high potency sweeteners include, but are not limited to, mogrosides, steviol glycosides, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I. The natural high potency sweetener can be provided as a pure compound or, alternatively, as part of an extract. For example, a mogroside can be provided as a sole compound or as part of a Luo Han Guo extract. The natural high potency sweetener is present in the sweetener component in an amount effective to provide a concentration from about 0.1 ppm to about 3,000 ppm when present in a consumable, such as, for example, a beverage.

In one embodiment, the additional sweetener is a caloric sweetener or mixture of caloric sweeteners. In another embodiment, the caloric sweetener is selected from sucrose, fructose, glucose, high fructose corn/starch syrup, a beet sugar, a cane sugar, and combinations thereof.

In another embodiment, the additional sweetener is a rare sugar selected from sorbose, lyxose, ribulose, xylose, xylulose, D-allose, L-ribose, D-tagatose, L-glucose, L-fucose, L-arabinose, turanose and combinations thereof.

VI. Compositions

In one embodiment, a composition comprises cyclamate and a steviol glycoside sweetener or mogroside sweetener described herein.

The steviol glycoside sweetener or mogroside sweetener is present in the composition in an amount such that, when added to a consumable, the steviol glycoside sweetener or mogroside sweetener is present in the consumable in a sweetening amount.

Cyclamate is present in the composition in an amount such that, when added to a consumable, cyclamate is present in the consumable at or below its sweetness recognition threshold concentration. In an exemplary embodiment, cyclamate is present in the composition in an amount such that, when added to a consumable, cyclamate is present in the consumable below its sweetness recognition threshold concentration.

Cyclamate is present in the composition in an amount such that, when the composition is added to a consumable, the sucrose equivalence (SE) of the consumable is enhanced by at least about 1.2-fold compared to the SE of the consumable in the absence of the cyclamate, such as, for example, at least about 1.5-fold, at least about 1.7-fold, at least about 2.5-fold, at least about 3.0-fold, or at least about 4.0-fold.

The amount of sucrose, and thus sweetness, in a reference solution may be described in degrees Brix (° Bx). One degree Brix is 1 gram of sucrose in 100 grams of solution and represents the strength of the solution as percentage by weight (% w/w) (strictly speaking, by mass).

In exemplary embodiments, the steviol glycoside sweetener or mogroside sweetener and cyclamate are present in the composition in an amount effective such that, when the composition is added to a consumable, the consumable has a sweetness equivalent to at least about 5 degrees Brix, such as, for example, at least about 6 degrees Brix, at least about 7 degrees Brix, at least about 8 degrees Brix, at least about 9 degrees Brix, at least about 10 degrees Brix, at least about 11 degrees Brix or at least about 12 degrees Brix. In other exemplary embodiments, the steviol glycoside sweetener or mogroside sweetener and cyclamate are present in the composition in an amount effective such that, when the composition is added to a consumable, the consumable has a sweetness equivalent to about 5 to about 12 degrees Brix.

The sweetness of a non-sucrose sweetener can also be measured against a sucrose reference by determining the non-sucrose sweetener's sucrose equivalence. Typically, taste panelists are trained to detect sweetness of reference sucrose solutions containing between 1-15% sucrose (w/w). Other non-sucrose sweeteners are then tasted at a series of dilutions to determine the concentration of the non-sucrose sweetener that is as sweet as a given percent sucrose reference. For example, if a solution of a non-sucrose sweetener is as sweet as a 10% sucrose solution, then the sweetener is said to be 10 times as potent as sucrose.

In exemplary embodiments, the steviol glycoside sweetener or mogroside sweetener and cyclamate are present in the composition in an amount effective such that, when the composition is added to a consumable, the consumable has a sucrose equivalence of at least about 5%, such as, for example, at least about 6%, at least about 7%, at least about 8%, at least about 9%, at least about 10%, at least about 11% or at least about 12%. In still other embodiments, the steviol glycoside sweetener or mogroside sweetener and cyclamate are present in the composition in an amount effective such that, when the composition is added to a consumable, the consumable has a sucrose equivalence from about 5% to about 12%, such as, for example, 5%, 6%, 7%, 8%, 9%, 10%, 11%, 12%, or any range between.

It should be noted that the comparisons are between (i) the consumable containing the composition and (ii) the same consumable, but without cyclamate.

The compositions can optionally include one or more additional sweeteners (described above) and/or additives. Exemplary additives including, but are not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof. In some embodiments, the additives act to improve the temporal and flavor profile of the sweetener to provide a sweetener component with a taste similar to sucrose.

VII. Consumables

In one embodiment, a consumable comprises a steviol glycoside sweetener and cyclamate. In another embodiment, a consumable comprises a mogroside sweetener and cyclamate.

In exemplary embodiments, the steviol glycoside sweetener or mogroside sweetener is present in the consumable in a concentration from about 50 ppm to about 600 ppm, such as, for example, about 50 ppm to about 500 ppm, from about 50 ppm to about 400 ppm, from about 50 ppm to about 300 ppm, from about 50 ppm to about 200 ppm, from about 50 ppm to about 100 ppm, about 100 ppm to about 600 ppm, about 100 ppm to about 500 ppm, about 100 ppm to about 400 ppm, about 100 ppm to about 300 ppm, about 100 ppm to about 200 ppm, about 200 ppm to about 600 ppm, about 200 ppm to about 500 ppm, about 200 ppm to about 400 ppm, about 200 ppm to about 300 ppm, about 300 ppm to about 600 ppm, about 300 ppm to about 500 ppm, about 300 ppm to about 400 ppm, about 400 ppm to about 600 ppm, about 400 ppm to about 500 ppm and about 500 ppm to about 600 ppm.

Cyclamate is present in the consumable at or below its sweetness recognition threshold concentration. The concentration of cyclamate in the consumable is effective to enhance the sweetness of the consumable (compared to the sweetness of the same consumable but without cyclamate), and optionally, modulate one or more taste attributes of the sweetener or sweetener component to make the consumable taste more like a sucrose-sweetened consumable (compared to the taste attributes of the same consumable but without cyclamate).

Cyclamate is present in the consumable in an amount effective to enhance the sucrose equivalence (SE) of the consumable by at least 1.2-fold when compared to the SE of the consumable in the absence of cyclamate, such as for example, at least about 1.3-fold, at least about 1.4-fold, at least about 1.5-fold, at least about 1.6-fold, at least about 1.7-fold, at least about 1.8-fold, at least about 1.9-fold and at least about 2.0-fold.

In exemplary embodiments, cyclamate is present in the consumable in a concentration from about 1 ppm to about 200 ppm, such as, for example, from about 1 ppm to about 150 ppm, from about 1 ppm to about 120 ppm, from about 1 ppm to about 100 ppm, from about 1 ppm to about 50 ppm, from about 1 ppm to about 30 ppm. In other exemplary embodiments, cyclamate is present in the consumable in a concentration from about 1 ppm to about 50 ppm, such as, for example, from about 1 ppm to about 45 ppm, from about 1 ppm to about 40 ppm, from about 1 ppm to about 35 ppm, from about 1 ppm to about 30 ppm, from about 1 ppm to about 25 ppm or from about 1 ppm to about 20 ppm In another embodiment, cyclamate is present in the consumable in a concentration from about 50 to about 200 ppm, from about 50 ppm to about 120 ppm, from about 50 ppm to about 100 ppm, from about 100 ppm to about 200 ppm, from about 100 ppm to about 120 ppm and from about 120 ppm to about 200 ppm.

In addition to providing sweetness enhancement, cyclamate optionally also modulates one or more taste attributes of steviol glycoside sweetener or mogroside sweetener to make the consumable taste more like a sucrose-sweetened consumable. Exemplary taste attribute modulations include decreasing or eliminating bitterness, decreasing or eliminating bitter linger, decreasing or eliminating sourness, decreasing or eliminating astringency, decreasing or eliminating licorice notes, decreasing or eliminating saltiness, decreasing or eliminating metallic notes, improving mouthfeel, decreasing or eliminating sweetness linger, and improving sweetness onset. Multiple taste attributes can be modulated simultaneously, such that the consumable, overall, has more sucrose-sweetened characteristics compared to the taste attributes of the same consumable but without cyclamate. Methods of quantifying improvement in sucrose-sweetened characteristics are known in the art and includes comparative taste testing and histogram mapping.

In exemplary embodiments, the steviol glycoside sweetener or mogroside sweetener and cyclamate are present in the consumable in an amount effective to provide the consumable with a sweetness equivalent to at least about 5 degrees Brix, such as, for example, at least about 6 degrees Brix, at least about 7 degrees Brix, at least about 8 degrees Brix, at least about 9 degrees Brix, at least about 10 degrees Brix, at least about 11 degrees Brix or at least about 12 degrees Brix. In other exemplary embodiments, the steviol glycoside sweetener or mogroside sweetener and cyclamate are present in the consumable in an amount effective to provide the consumable with a sweetness equivalent to about 5 to about 12 degrees Brix, such as, for example, 5 degrees Brix, 6 degrees Brix, 7 degrees Brix, 8 degrees Brix, 9 degrees Brix, 10 degrees Brix, 11 degrees Brix, 12 degrees Brix, or any range between.

In other exemplary embodiments, the steviol glycoside sweetener or mogroside sweetener and cyclamate are present in the consumable in an amount effective to provide the consumable with a sucrose equivalence of at least about 5%, such as, for example, at least about 6%, at least about 7%, at least about 8%, at least about 9%, at least about 10%, at least about 11% or at least about 12%. In still other embodiments, the steviol glycoside sweetener or mogroside sweetener and cyclamate are present in the consumable in an amount effective to provide the consumable with a sucrose equivalence from about 5% to about 12%.

Consumables of the present invention have enhanced sweetness over comparable consumables that do not contain cyclamate. In exemplary embodiments, the sucrose equivalence of a consumable of the present invention is more than just additive, i.e. the sucrose equivalence of a consumable of the present invention is greater than the sum of (i) the sucrose equivalence of cyclamate as measured in the same matrix as the consumable of the invention, but without the steviol glycoside sweetener or mogroside sweetener and (ii) the sucrose equivalence of the steviol glycoside sweetener or mogroside sweetener as measured in the same matrix as the consumable of the invention, but without cyclamate.

Exemplary consumables include, but are not limited to, edible gel mixes and compositions, dental compositions, foodstuffs (confections, condiments, chewing gum, cereal compositions, baked goods, dairy products, and tabletop sweetener compositions) beverages and beverage products.

In addition to the sweetener and cyclamate and, optionally, other sweeteners, the consumable can optionally include one or more additional additives. Exemplary additives including, but are not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof.

In one embodiment, the consumable further comprises one or more polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

Suitable amino acid additives include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid ($\alpha$-, $\beta$-, and/or $\delta$-isomers), glutamine, hydroxyproline, taurine, norvaline, sarcosine, and their salt forms such as sodium or potassium salts or acid salts. The amino acid additives also may be in the D- or L-configuration and in the mono-, di-, or tri-form of the same or different amino acids. Additionally, the amino acids may be $\alpha$-, $\beta$-, $\gamma$- and/or $\delta$-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-$\alpha$-lysine or poly-L-$\epsilon$-lysine), poly-L-ornithine (e.g., poly-L-$\alpha$-ornithine or poly-L-$\epsilon$-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be $\alpha$-, $\beta$-, $\gamma$-, $\delta$-, and $\epsilon$-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-α-lysine with a MW of 1,500, MW of 6,000, MW of 25,200, MW of 63,000, MW of 83,000, or MW of 300,000.

Suitable sugar acid additives include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In particular embodiments, the organic acid additive is present in the sweetener composition in an amount effective to provide a concentration from about 10 ppm to about 5,000 ppm when present in a consumable, such as, for example, a beverage.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

Suitable bitter compound additives include, but are not limited to, caffeine, quinine, urea, bitter orange oil, naringin, quassia, and salts thereof.

Suitable flavorants and flavoring ingredient additives include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Döhler™ Natural Flavoring Sweetness Enhancer K14323 (Döhler™ Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, New Jersey, U.S.A.), and Sucramask™ (Creative Research Management, Stockton, California, U.S.A.).

Suitable polymer additives include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

Suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

Suitable flavonoid additives are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

Suitable alcohol additives include, but are not limited to, ethanol. In particular embodiments, the alcohol additive is present in the consumable in a concentration from about 625 ppm to about 10,000 ppm.

Suitable astringent compound additives include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols). The astringent additive is present in the sweetened composition in a concentration from about 10 ppm to about 5,000 ppm.

The consumables provided herein can also contain one or more functional ingredients, which provide a real or perceived heath benefit to the composition. Functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

Beverage and Beverage Products

In one embodiment, the consumable is a beverage or beverage product. "Beverage product", as used herein, is a ready-to-drink beverage, a beverage concentrate, a beverage syrup, or a powdered beverage. Suitable ready-to-drink beverages include carbonated and non-carbonated beverages. Carbonated beverages include, but are not limited to, frozen carbonated beverages, enhanced sparkling beverages, cola, fruit-flavored sparkling beverages (e.g. lemon-lime, orange, grape, strawberry and pineapple), ginger-ale, soft drinks and root beer. Non-carbonated beverages include, but are not limited to, still beverages, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, café au lait, milk tea, fruit milk beverages), beverages containing cereal extracts and smoothies.

Beverage concentrates and beverage syrups are prepared with an initial volume of liquid matrix (e.g. water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages comprise a matrix, i.e. the basic ingredient in which the ingredients—including the compositions of the present invention—are dissolved. In one embodiment, a beverage comprises water of beverage quality as the matrix, such as, for example deionized water, distilled water, reverse osmosis water, carbonated water, purified water, demineralized water and combinations thereof, can be used.

The matrix can be acidic or basic water. Exemplary matrices contain phosphoric acid, phosphate buffer, citric acid, citrate buffer or carbon-treated water.

In one embodiment, the matrix is acidic. In another embodiment, the matrix comprises citric acid. In still another embodiment, the matrix is acidic water comprising citric acid.

The beverage or beverage product can further include at least one additional sweetener. Any of the sweeteners detailed herein can be used, including natural, non-natural, or synthetic sweeteners. In certain embodiments, the beverage or beverage product does not contain a carbohydrate sweetener.

In one embodiment, the beverage or beverage products comprise a rare sugar. Suitable rare sugars include, but are not limited to, allulose, sorbose, lyxose, ribulose, xylose, xylulose, D-allose, L-ribose, D-tagatose, L-glucose, L-fucose, L-arabinose, turanose and combinations thereof. The rare sugars can be present in beverage in an amount from about 0.5% to about 3.0%, such as, for example, about 0.5% to about 2.5%, about 0.5% to about 2.0%, about 0.5% to about 1.5%, about 0.5% to about 1.0%, about 1.0% to about 3.0%, about 1.0% to about 2.5%, about 1.0% to about 2.0%, about 1.0% to about 1.5%, about 2.0% to about 3.0% and about 2.0% to about 2.5%. In a particular embodiment, the rare sugar is allulose.

The beverage or beverage product can contain additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, caffeine, flavorants and flavoring ingredients, astringent compounds, proteins or protein hydrolysates, surfactants, emulsifiers, weighing agents, juice, dairy, cereal and other plant extracts, flavonoids, alcohols, polymers and combinations thereof. Any suitable additive described herein can be used.

The beverage or beverage product can contain one or more functional ingredients. Functional ingredients include, but are not limited to, vitamins, minerals, antioxidants, preservatives, glucosamine, polyphenols and combinations thereof. Any suitable functional ingredient described herein can be used.

It is contemplated that the pH of the consumable, such as, for example, a beverage, does not materially or adversely affect the taste of the sweetener. A non-limiting example of the pH range of the beverage may be from about 1.8 to about 10, such as, for example, from about 2 to about 7 or about 2.5 to about 4.2 One of skill in the art will understand that the pH of the beverage can vary based on the type of beverage.

The titratable acidity of a beverage may, for example, range from about 0.01 to about 1.0% by weight of beverage.

In one embodiment, the sparkling beverage product has an acidity from about 0.01 to about 1.0% by weight of the beverage, such as, for example, from about 0.05% to about 0.25% by weight of beverage.

The carbonation of a sparkling beverage product has 0 to about 2% (w/w) of carbon dioxide or its equivalent, for example, from about 0.1 to about 1.0% (w/w).

The beverage can be caffeinated or non-caffeinated.

The temperature of a beverage may, for example, range from about 4° C. to about 100° C., such as, for example, from about 4° C. to about 25° C.

The calorie content of the beverage can vary. In one embodiment, the beverage is a full-calorie beverage that has up to about 120 calories per 8 oz serving. In another embodiment, the beverage is a mid-calorie beverage that has up to about 60 calories per 8 oz. serving. In still another embodiment, the beverage is a low-calorie beverage that has up to about 40 calories per 8 oz. serving. In yet another embodiment, the beverage can be a zero-calorie that has less than about 5 calories per 8 oz. serving.

In a particular embodiment, the beverage is a cola beverage. In a more particular embodiment, the cola beverage further comprises caffeine. In another more particular embodiment, the cola beverage can be a low-, mid- or zero-calorie beverage.

The concentration of the sweetener and cyclamate can vary, as set forth above.

In a particular embodiment, the present invention provides a beverage comprising cyclamate and a steviol glycoside sweetener comprising rebaudioside M. Cyclamate is present at or below its sweetness recognition threshold concentration, as set forth above. In a particular embodiment, cyclamate is present below its sweetness recognition threshold concentration. In a more particular embodiment, the concentration of cyclamate in the beverage is from about 1 ppm to about 100 ppm, such as, for example, from about 1 ppm to about 50 ppm or from about 1 ppm to about 30 ppm. The concentration of the steviol glycoside sweetener in the beverage is from about 100 ppm to about 600 ppm, more particularly from about 100 ppm to about 400 ppm or about 250 ppm to about 350 ppm.

Beverages of the present invention have enhanced sweetness over comparable beverages that do not contain cyclamate. In exemplary embodiments, the sucrose equivalence of a beverage of the present invention is more than just additive, i.e. the sucrose equivalence of a beverage of the present invention is greater than the sum of (i) the sucrose equivalence of cyclamate as measured in the same matrix as the beverage of the invention (no steviol glycoside sweetener or mogroside sweetener present), and (ii) the sucrose equivalence of the steviol glycoside sweetener or mogroside sweetener as measured in the same matrix as the beverage of the invention, but without cyclamate.

The beverage can optionally include additives, functional ingredients and combinations thereof, as described herein. Any of the additives and/or functional ingredients described above can be present in the consumable.

Edible Gel Mixes and Edible Gel Compositions

In one embodiment, the consumable is an edible gel or edible gel mix.

Edible gels are gels that can be eaten. Non-limiting examples of edible gel compositions for use in particular embodiments include gel desserts, puddings, jellies, pastes, trifles, aspics, marshmallows, gummy candies, or the like. Edible gel mixes generally are powdered or granular solids to which a fluid may be added to form an edible gel composition. Non-limiting examples of fluids for use in particular embodiments include water, dairy fluids, dairy analogue fluids, juices, alcohol, alcoholic beverages, and combinations thereof. Non-limiting examples of dairy fluids which may be used in particular embodiments include milk, cultured milk, cream, fluid whey, and mixtures thereof. Non-limiting examples of dairy analogue fluids which may be used in particular embodiments include, for example, soy milk and non-dairy coffee whitener Confections In one embodiment, the consumable is a confection. As referred to herein, "confection" can mean a sweet, a lollie, a confectionery, or similar term. The confection generally contains a base composition component and a sweetener component. According to particular embodiments of the present invention, the confections may be desserts such as yogurt, jellies, drinkable jellies, puddings, Bavarian cream, blancmange, cakes, brownies, mousse and the like, sweetened food products eaten at tea time or following meals; frozen foods; cold confections, e.g. types of ice cream such as ice cream, ice milk, lacto-ice and the like, and ice confections such as sherbets, dessert ices and the like; general confections, e.g., baked confections or steamed confections such as crackers, biscuits, buns with bean-jam filling, halvah, alfajor, and the like; rice cakes and snacks; table top products; general sugar confections such as chewing gum, hard candy, soft candy, mints, nougat candy, jelly beans, fudge, toffee, taffy, Swiss milk tablet, licorice candy, chocolates, gelatin candies, marshmallow, marzipan, divinity, cotton candy, and the like; sauces including fruit flavored sauces, chocolate sauces and the like; edible gels; crèmes including butter crèmes, flour pastes, whipped cream and the like; jams including strawberry jam, marmalade and the like; and breads including sweet breads and the like or other starch products, and combinations thereof.

Condiment Compositions

In one embodiment, the consumable is a condiment. Condiments, as used herein, are compositions used to enhance or improve the flavor of a food or beverage. Non-limiting examples of condiments include ketchup; mustard; barbecue sauce; butter; chili sauce; chutney; cocktail sauce; curry; dips; fish sauce; horseradish; hot sauce; jellies, jams, marmalades, or preserves; mayonnaise; peanut butter; relish; remoulade; salad dressings; salsa; sauerkraut; soy sauce; steak sauce; syrups; tartar sauce; and Worcestershire sauce. Condiment bases generally comprise a mixture of different ingredients, non-limiting examples of which include vehicles (e.g., water and vinegar); spices or seasonings (e.g., salt, pepper, garlic, mustard seed, onion, paprika, turmeric, and combinations thereof); fruits, vegetables, or their products (e.g., tomatoes or tomato-based products (paste, puree), fruit juices, fruit juice peels, and combinations thereof); oils or oil emulsions, particularly vegetable oils; thickeners (e.g., xanthan gum, food starch, other hydrocolloids, and combinations thereof); and emulsifying agents (e.g., egg yolk solids, protein, gum arabic, carob bean gum, guar gum, gum karaya, gum tragacanth, carageenan, pectin, propylene glycol esters of alginic acid, sodium carboxymethyl-cellulose, polysorbates, and combinations thereof). Recipes for condiment bases and methods of making condiment bases are well known to those of ordinary skill in the art.

Chewing Gum Compositions

In one embodiment, the consumable is a chewing gum composition. Chewing gum compositions generally comprise a water-soluble portion and a water-insoluble chewable gum base portion. The water soluble portion dissipates with a portion of the flavoring agent over a period of time during chewing while the insoluble gum base portion is retained in the mouth. The insoluble gum base generally determines whether a gum is considered chewing gum, bubble gum, or a functional gum.

Flavoring agents may be used in either the insoluble gum base or soluble portion of the chewing gum composition. Such flavoring agents may be natural or artificial flavors. In a particular embodiment, the flavoring agent comprises an essential oil, such as an oil derived from a plant or a fruit, peppermint oil, spearmint oil, other mint oils, clove oil, cinnamon oil, oil of wintergreen, bay, thyme, cedar leaf, nutmeg, allspice, sage, mace, and almonds. In another particular embodiment, the flavoring agent comprises a plant extract or a fruit essence such as apple, banana, watermelon, pear, peach, grape, strawberry, raspberry, cherry, plum, pineapple, apricot, and mixtures thereof. In still another particular embodiment, the flavoring agent comprises a citrus flavor, such as an extract, essence, or oil of lemon, lime, orange, tangerine, grapefruit, citron, or kumquat.

Cereal Compositions

In one embodiment, the consumable is a cereal composition. Cereal compositions typically are eaten either as staple foods or as snacks. Non-limiting examples of cereal compositions for use in particular embodiments include ready-to-eat cereals as well as hot cereals. Ready-to-eat cereals are cereals which may be eaten without further processing (i.e. cooking) by the consumer. Examples of ready-to-eat cereals include breakfast cereals and snack bars. Breakfast cereals typically are processed to produce a shredded, flaky, puffy, or extruded form. Breakfast cereals generally are eaten cold and are often mixed with milk and/or fruit. Snack bars include, for example, energy bars, rice cakes, granola bars, and nutritional bars. Hot cereals generally are cooked, usually in either milk or water, before being eaten. Non-limiting examples of hot cereals include grits, porridge, polenta, rice, and rolled oats.

Cereal compositions generally comprise at least one cereal ingredient. As used herein, the term "cereal ingredient" denotes materials such as whole or part grains, whole or part seeds, and whole or part grass. Non-limiting examples of cereal ingredients for use in particular embodiments include maize, wheat, rice, barley, bran, bran endosperm, bulgur, soghums, millets, oats, rye, triticale, buchwheat, fonio, quinoa, bean, soybean, amaranth, teff, spelt, and kaniwa.

Baked Goods

In one embodiment, the consumable is a baked good. "Baked goods," as used herein, include ready to eat and all ready to bake products, flours, and mixes requiring preparation before serving. Non-limiting examples of baked goods include cakes, crackers, cookies, brownies, muffins, rolls, bagels, donuts, strudels, pastries, croissants, biscuits, bread, bread products, and buns.

Baked goods in accordance with particular embodiments of this invention generally comprise a combination of sweetener, water, fat and leavening agent. Baked goods made in accordance with many embodiments of this invention also contain flour in order to make a dough ora batter.

According to particular embodiments of this invention, leavening agents may comprise chemical leavening agents or yeast leavening agents. Non-limiting examples of chemical leavening agents suitable for use in particular embodiments of this invention include baking soda (e.g., sodium, potassium, or aluminum bicarbonate), baking acid (e.g., sodium aluminum phosphate, monocalcium phosphate, or dicalcium phosphate), and combinations thereof.

Dairy Products

In one embodiment, the consumable is a dairy product. In one embodiment, the sweetened composition is a dairy product. Dairy products and processes for making dairy products suitable for use in this invention are well known to those of ordinary skill in the art. Dairy products, as used herein, comprise milk or foodstuffs produced from milk. Non-limiting examples of dairy products suitable for use in embodiments of this invention include milk, milk cream, sour cream, crème fraiche, buttermilk, cultured buttermilk, milk powder, condensed milk, evaporated milk, butter, cheese, cottage cheese, cream cheese, yogurt, ice cream, frozen custard, frozen yogurt, gelato, vla, piima, filmjölk, kajmak, kephir, viili, kumiss, airag, ice milk, casein, ayran, lassi, khoa, or combinations thereof. The dairy products can be produced through conventional means or can be filtered or further modified to adjust the taste properties. In certain embodiments, the dairy products can be liquid dairy products from which one or more of the carbohydrate sugars (lactose or its breakdown products galactose or glucose) are reduced as compared to milk prior to such processing, or are substantially removed and which are supplemented with the sweetening composition described herein. The reduction of carbohydrates can be about 5% or about 10% or about 20% or about 50% or about 70% or more as compared to unprocessed milk.

According to particular embodiments of this invention, the dairy compositions also may comprise other additives. Non-limiting examples of suitable additives include sweeteners and flavorants such as chocolate, strawberry, and banana. Particular embodiments of the dairy compositions provided herein also may comprise additional nutritional supplements such as vitamins (e.g., vitamin D) and minerals (e.g., calcium) to improve the nutritional composition of the milk.

Tabletop Sweetener Compositions

In one embodiment, the consumable is a tabletop sweetener. The tabletop sweetener can further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, and mixtures thereof. Additionally, in accordance with still other embodiments of the invention, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refer to any composition which assists in content uniformity and uniform dissolution. In accordance with particular embodiments, non-limiting examples of anti-caking agents include cream of tartar, calcium silicate, silicon dioxide, microcrystalline cellulose (Avicel, FMC BioPolymer, Philadelphia, Pennsylvania), and tricalcium phosphate. In one embodiment, the anti-caking agents are present in the tabletop sweetener composition in an amount from about 0.001 to about 3% by weight of the tabletop sweetener composition.

The tabletop sweetener compositions can be packaged in any form known in the art. Non-limiting forms include, but are not limited to, powder form, granular form, packets, tablets, sachets, pellets, cubes, solids, and liquids.

In one embodiment, the tabletop sweetener composition is a single-serving (portion control) packet comprising a dry-blend. Dry-blend formulations generally may comprise powder or granules. Although the tabletop sweetener composition may be in a packet of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar (— 8 g). In a particular embodiment, a dry-blend tabletop sweetener formulation may contain a sweetener an amount from about 1% (w/w) to about 10% (w/w).

A tabletop sweetener composition also may be embodied in the form of a liquid, wherein a steviol glycoside blend of the present invention or a sweetener composition comprising the same is combined with a liquid carrier. Suitable non-limiting examples of carrier agents for liquid tabletop sweeteners include water, alcohol, polyol, glycerin base or citric acid base dissolved in water, and mixtures thereof. The sweetness equivalent of a tabletop sweetener composition for any of the forms described herein or known in the art may be varied to obtain a desired sweetness profile. For example, a tabletop sweetener composition may comprise a sweetness comparable to that of an equivalent amount of standard sugar. In another embodiment, the tabletop sweetener composition may comprise a sweetness of up to 100 times that of an equivalent amount of sugar. In another embodiment, the tabletop sweetener composition may comprise a sweetness of up to 90 times, 80 times, 70 times, 60 times, 50 times, 40 times, 30 times, 20 times, 10 times, 9 times, 8 times, 7 times, 6 times, 5 times, 4 times, 3 times, and 2 times that of an equivalent amount of sugar.

VIII. Methods

Methods of enhancing the sweetness of a consumable and/or modulating one or more taste attributes of the sweetener to make the consumable taste more like a sucrose-sweetened consumable are provided.

In one embodiment, a method of enhancing the sweetness of a consumable comprises (i) providing a consumable comprising a steviol glycoside sweetener or a mogroside sweetener and (ii) adding cyclamate to the consumable in an amount effective to provide a consumable with enhanced sweetness, wherein cyclamate is added in an amount such that it is present in a concentration at or below its sweetness recognition threshold in the consumable with enhanced sweetness.

In another embodiment, a method of enhancing the sweetness of a consumable comprises (i) providing a consumable matrix and (ii) adding cyclamate and steviol glycoside sweetener or mogroside sweetener to provide a consumable with enhanced sweetness, wherein cyclamate is added to the consumable matrix in an amount such that it is present in a concentration at or below its sweetness recognition threshold in the consumable with enhanced sweetness. The sweetener and cyclamate can be added together, i.e. in the form of a composition, or separately.

As used herein, the term "consumable matrix" refers to a consumable containing all typical ingredients except the sweetener or sweetener component.

In exemplary embodiments, the SE of the consumable with enhanced sweetness is enhanced by at least about 1.2-fold compared to the SE of the consumable in the absence of the cyclamate, such as, for example, at least about 1.3-fold, at least about 1.4-fold, at least about 1.5-fold, at least about 1.6-fold, at least about 1.7-fold, at least about 1.8-fold, at least about 1.9-fold and at least about 2.0-fold.

In a particular embodiment, the consumable is a beverage.

Accordingly, a method of enhancing the sweetness of a beverage comprises (i) providing a beverage comprising a steviol glycoside sweetener or mogroside sweetener and (ii) adding cyclamate to the beverage in an amount effective to provide a beverage with enhanced sweetness, wherein cyclamate is added in an amount such that it is present in a concentration at or below its sweetness recognition threshold in the beverage with enhanced sweetness.

In another embodiment, a method of enhancing the sweetness of a beverage comprises (i) providing a beverage matrix and (ii) adding cyclamate and a steviol glycoside sweetener or mogroside sweetener to provide a beverage with enhanced sweetness, wherein cyclamate is added to the beverage matrix in an amount such that cyclamate is present in a concentration at or below its sweetness recognition threshold in the beverage with enhanced sweetness. The sweetener and cyclamate can be added together, i.e. in the form of a composition, or separately. In exemplary embodiments, the method further comprises making the consumable taste more like a sucrose-sweetened consumable.

Methods or preparing consumables with enhanced sweetness and, optionally, a more sucrose-sweetened taste profile, are also provided.

In one aspect, a method of preparing a consumable comprises (i) providing a consumable comprising a steviol glycoside sweetener or a mogroside sweetener and (ii) adding cyclamate to the consumable, wherein cyclamate is present in the consumable in a concentration at or below its sweetness recognition threshold. In exemplary embodiments, the consumable is a consumable with enhanced sweetness compared to a consumable in the absence of cyclamate.

In another aspect, a method of preparing a consumable comprises (i) providing a consumable matrix and (ii) adding cyclamate and a steviol glycoside sweetener or a mogroside sweetener to provide a consumable, wherein cyclamate is added to the consumable matrix in an amount such that it is present in a concentration at or below its sweetness recognition threshold in the consumable. In exemplary embodiments, the consumable is a consumable with enhanced sweetness compared to a consumable in the absence of cyclamate. The sweetener and cyclamate can be added together, i.e. in the form of a composition, or separately.

In yet another aspect, a method of preparing a beverage comprises (i) providing a beverage matrix and (ii) adding cyclamate and a steviol glycoside sweetener or a mogroside sweetener to provide a beverage, wherein cyclamate is added to the beverage matrix in an amount such that it is present in a concentration at or below its sweetness recognition threshold in the beverage. In exemplary embodiments, the beverage has enhanced sweetness compared to a beverage in the absence of cyclamate. The sweetener and cyclamate can be added together, i.e. in the form of a composition, or separately. Optionally, the sweetener can be added in the form of a sweetener component.

In a still further aspect, a method of preparing a sweetened beverage comprises (i) providing an unsweetened beverage and (ii) adding cyclamate and a steviol glycoside sweetener or mogroside sweetener to the unsweetened beverage to provide a sweetened beverage, wherein cyclamate is added to the unsweetened beverage in an amount such that it is present in a concentration at or below its sweetness recognition threshold in the sweetened beverage. In exemplary embodiments, the sweetened beverage has enhanced sweetness compared to a sweetened beverage in the absence of cyclamate. The sweetener and cyclamate can be added together, i.e. in the form of a composition, or separately. Optionally, the sweetener can be added in the form of a sweetener component.

EXAMPLES

Example 1: Sweetness Enhancement of Rebaudioside M (320 ppm) with Cyclamate (30 ppm)

The ability of cyclamate to impact the sweetness profile of 320 ppm rebaudioside M was evaluated.

Sample Preparation

TABLE 1

30 ppm of Cyclamate in acidic water

| Ingredient | Amount |
|---|---|
| Cyclamate | 30 mg |
| Citric acid | 250 mg |
| Water | 1000 g |

TABLE 2 acidic water

| Ingredient | Amount |
|---|---|
| Citric acid | 125 mg |
| Water | 500 g |

TABLE 3

30 ppm of Cyclamate and 320 ppm
of Rebaudioside M in acidic water

| Ingredient | Amount |
|---|---|
| Rebaudioside M | 32 mg |
| Cyclamate in acidic Water (Table 1) | 100 g |

TABLE 4

320 ppm of Rebaudioside M in acidic water

| Ingredient | Amount |
|---|---|
| Rebaudioside M | 32 mg |
| Acidic Water (Table 2) | 100 g |

TABLE 3

Sucrose in acidic water

| Ingredient | 1.5% Sucrose | 8% Sucrose | 9% Sucrose | 10% Sucrose |
|---|---|---|---|---|
| Water | 98.5 g | 92 g | 91 g | 90 g |
| Sucrose | 1.5 g | 8 g | 9 g | 10 g |
| Citric acid | 25 mg | 25 mg | 25 mg | 25 mg |

Ingredients were added to water while stirring until solids were visibly dissolved and the sample was poured into a glass bottle and stored at 4° C.

Taste Evaluation

Taste tests were carried out with one panelist. Bottles were removed from the refrigerator and about 25 ml of beverage was poured into 4 oz-plastic cups. The panelist was given mineral water to rinse their mouth before tasting and between tasting different samples. Unsalted crackers were also provided to eat followed by rinsing the mouth with mineral water before tasting the next sample.

The panelist was asked to compare the taste profile of (i) a sample of 320 ppm rebaudioside M in acidic water and (ii) a sample of 320 ppm rebaudioside M and 30 ppm cyclamate (below the sweetness recognition threshold concentration) in acidic water to control sucrose acidic water solutions (8%, 9%, and 10%). The panelist was instructed to sip, evaluate the sweetness, and then spit the sample in cups provided for that purpose.

The 320 ppm rebaudioside M sample was less sweet than the 8% sucrose solution. The sample containing 320 ppm rebaudioside M and 30 ppm cyclamate was sweeter than the 10% sucrose solution and had more mouthfeel.

Example 2: Sweetness Enhancement of Rebaudioside M (150 ppm) with Cyclamate (30 ppm)

The ability of cyclamate to impact the sweetness profile of 150 ppm rebaudioside M was evaluated.

Sample Preparation

TABLE 1

30 ppm of Cyclamate and 150 ppm
of Rebaudioside M in acidic water

| Ingredient | Amount |
|---|---|
| Rebaudioside M | 30 mg |
| Cyclamate in acidic Water (Table 1 in example 1) | 200 g |

TABLE 2

150 ppm of Rebaudioside M in acidic water

| Ingredient | Amount |
|---|---|
| Rebaudioside M | 30 mg |
| Acidic Water (Table 2 in example 1) | 200 g |

Ingredients were added to water while stirring until solids were visibly dissolved and the sample was poured into a glass bottle and stored at 4° C.

Taste tests were carried out with one panelist. Bottles were removed from the refrigerator and about 25 ml of beverage was poured into 4 oz-plastic cups. The panelist was given mineral water to rinse their mouth before tasting and between tasting different samples. Unsalted crackers were also given to eat followed by rinsing the mouth with mineral water before tasting the next sample.

Initially, the panelist was asked to determine the sweetness of the 30 ppm of cyclamate (Table 1). It was reported as not sweet.

The panelist was asked to compare the taste profile of (i) a sample of 150 ppm rebaudioside M in acidic water and (ii) a sample of 150 ppm rebaudioside M and 30 ppm cyclamate (below the sweetness recognition threshold concentration) in acidic water. The panelist was asked to compare the sweetness and taste profiles of the two samples.

The sample containing 150 ppm rebaudioside M and 30 ppm cyclamate was found to be sweeter, have more mouthfeel, and have less sweet linger than the sample containing only rebaudioside M.

Example 3: Sweetness Enhancement of Samples Containing Cyclamate (30 ppm) with Siamenoside I (150 ppm)

Sample Preparation

TABLE 1

30 ppm of Cyclamate in acidic water

| Ingredient | Amount |
|---|---|
| Cyclamate | 30 mg |
| Citric acid | 250 mg |
| Water | 1000 g |

TABLE 2 acidic water

| Ingredient | Amount |
|---|---|
| Citric acid | 125 mg |
| Water | 500 g |

TABLE 3

30 ppm of Cyclamate and 150 ppm of Siamenoside I in acidic water

| Ingredient | Amount |
|---|---|
| Siamenoside I | 30 mg |
| Cyclamate in acidic Water (Table 1) | 200 g |

TABLE 4

150 ppm of Siamenoside I in acidic water

| Ingredient | Amount |
|---|---|
| Siamenoside I | 30 mg |
| Acidic Water (Table 2) | 200 g |

Ingredients were added to water while stirring until solids were visibly dissolved and the sample was poured into a glass bottle and stored at 4° C.

Taste tests were carried out with one panelist. Bottles were removed from the refrigerator and about 25 ml of beverage was poured into 4 oz-plastic cups. The panelist was given mineral water to rinse their mouth before tasting and between tasting different samples. Unsalted crackers were also given to eat followed by rinsing the mouth with mineral water before tasting the next sample.

Initially, the panelist was asked to determine the sweetness of the 30 ppm of cyclamate (Table 1). It was reported as not sweet.

The panelist was asked to compare the taste profile of (i) a sample of 150 ppm siamenoside I in acidic water and (ii) a sample of 150 ppm siamenoside I and 30 ppm cyclamate in acidic water. The panelist was asked to compare the sweetness and taste profiles of the two samples.

The sample containing 150 ppm siamenoside I and 30 ppm cyclamate was found to be sweeter, have more mouthfeel, and have slightly earlier sweetness on-set than the sample containing only siamenoside I.

The invention claimed is:

1. A method of preparing a beverage with enhanced sweetness comprising: (i) providing a beverage comprising a steviol glycoside sweetener comprising at least about 50% rebaudioside M by weight on a dry basis; (ii) adding from about 1 ppm to about 200 ppm cyclamate to the beverage to provide a beverage with enhanced sweetness.

2. The method of claim 1, wherein the steviol glycoside sweetener is a steviol glycoside blend.

3. The method of claim 1, wherein the steviol glycoside sweetener is present in the beverage with enhanced sweetness in a concentration from about 50 ppm to about 600 ppm.

4. The method of claim 1, wherein the beverage with enhanced sweetness has one or more of the following attributes: less bitterness, less bitter linger, less sourness, less astringency, less saltiness, less metallic notes, less licorice notes, better mouthfeel, less sweetness linger or improved sweetness onset, when compared to a corresponding beverage without the cyclamate.

5. The method of claim 1, wherein the beverage with enhanced sweetness has a sucrose equivalence of at least about 5%.

6. The method of claim 1, wherein the beverage is selected from the group consisting of a zero-calorie beverage, a low-calorie beverage and a mid-calorie beverage.

* * * * *